ated States                                  [11] 3,856,952
Huber                                         [45] Dec. 24, 1974

[54] SYNERGISTIC ANTIMICROBIAL COMPOSITIONS EMPLOYING CERTAIN N-(PHENYL-CARBAMYL)AMINO-BENZENE SULFONYL FLOURIDES

[75] Inventor: Ludwig Konrad Huber, King of Prussia, Pa.

[73] Assignee: Pennwalt Corporation, Philadelphia, Pa.

[22] Filed: Mar. 1, 1973

[21] Appl. No.: 337,047

[52] U.S. Cl.................. 424/233, 424/65, 424/315, 424/341, 424/322, 424/347, 106/15 AF, 117/138.5, 162/161, 252/106
[51] Int. Cl............................................ A01n 9/02
[58] Field of Search............... 424/233, 322, 315; 252/106, 107

[56] References Cited
UNITED STATES PATENTS

| | | | |
|---|---|---|---|
| 3,284,363 | 11/1966 | Bright | 424/233 |
| 3,584,128 | 6/1971 | Reller et al. | 424/233 |
| 3,743,675 | 7/1973 | Huber | 260/543 F |

Primary Examiner—Vincent D. Turner
Attorney, Agent, or Firm—Carl A. Hechmer, Jr.

[57] ABSTRACT

An antifungal and antibacterial composition consisting essentially of a mixture of an N-(phenyl-carbamyl)-aminobenzene sulfonyl fluoride with 3,4'5-tribromosalicylanilide, 3,4,4'-trichlorocarbanilide, hexachlorophene, or 2,4,4'-trichloro-2'-hydroxydiphenyl ether.

7 Claims, No Drawings

SYNERGISTIC ANTIMICROBIAL COMPOSITIONS EMPLOYING CERTAIN N-(PHENYL-CARBAMYL)AMINO-BENZENE SULFONYL FLOURIDES

This invention relates to an antimicrobial composition which comprises a novel mixture of active agents. More particularly, this invention concerns a combination of an N-(phenyl-carbamyl)aminobenzene sulfonyl fluoride with at least one compound selected from the group consisting of 3,4', 5-tribromosalicylanilide, 3,4,4'-trichlorocarbanilide, hexachlorophene, and 2,4,-4'-trichloro-2'-hydroxydiphenyl ether. Said combination, or mixture, of agents provides unusually good inhibition of bacterial and fungal growth, and for purposes of brevity herein may be referred to merely as an antimicrobial composition.

3,4', 5-Tribromosalicylanilide, 3,4,4'-trichlorocarbanilide, hexachlorophene, and 2,4,4'-trichloro-2'-hydroxydiphenyl ether are well known antibacterial agents which are widely used in various commercial products such as deodorant soaps, detergents, cosmetic formulations, oral hygienic preparations, etc. Although these antibacterial agents are quite effective as such, they have various disadvantages which tend to limit their uses. For instance, hexachlorophene is known to be quite toxic, and tribromosalicylamide, though less toxic, can effect skin sensitization and, like trichlorocarbanilide, exhibits only a low activity against gram negative bacteria such as *Escherichia coli*. It is therefore not only for economic but also for health reasons that more potent formulations of these antimicrobial agents are needed to reduce their operable concentrations while maintaining or broadening their antimicrobial potency.

In the copending application for patent of Ludwig K. Huber, Ser. No. 270,348, filed July 10, 1972 now U.S. Pat. No. 3,743,675, is disclosed a new family of compounds useful as antimicrobial agents, i.e., N-(phenylcarbamyl)-aminobenzene-sulfonyl fluorides having the general formula

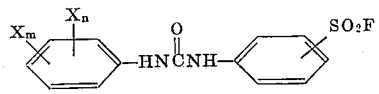

wherein X is chlorine, bromine, trifluoromethyl, methoxy or fluorosulfonyl; X' is hydrogen, chlorine, bromine, trifluoromethyl, methoxy or fluorosulfonyl; $m$ is a whole number from 1 to 3, and $n$ is a whole number from 1 to 3. Preferred compounds embodied in this family are:
N-(3,4-dichlorophenyl-carbamyl)-sulfanilyl fluoride,
N-(4-bromophenyl-carbamyl)-sulfanilyl fluoride,
N-(3-trifluoromethyl-4-chlorophenyl-carbamyl)-sulfanilyl fluoride,
N-(2,5-dichlorophenyl-carbamyl)-sulfanilyl fluoride,
N-(3-fluorosulfonylphenyl-carbamyl)-sulfanilyl fluoride,
N-(4-methoxyphenyl-carbamyl)-sulfanilyl fluoride, and
N(3,4-dichlorophenyl-carbamyl)-metanilyl fluoride.

It has now been discovered that said N-(phenyl-carbamyl)aminobenzene sulfonyl fluoride synergistally enhances the biological activity of the aforementioned commercial antimicrobial agents when used in combination, i.e., in admixture, therewith. "Synergism" refers to the phenomenon that the potency resulting from the combination of two or more discrete agents is greater than the sum of potencies of the agents taken independently. Since minor amounts of either class of agent in the compositions of the invention embodied herein produce a synergestic result in biological effects, the weight ratio of the N-(phenyl-carbamyl)aminobenzene sulfonyl fluoride constituent to one or more of the compounds from class consisting of 3,4'5-tribromosalicylanilide, 3,4,4'-trichlorocarbanilide, hexachlorophene, and 2,4,4'-trichloro-2'-hydroxydiphenyl ether can be varied widely, for example, in the range of from about 10:1 to 1:10 by weight, although the preferred weight ratio is in the range of 8:1 to 1:8.

The compositions of the invention or carriers containing them for their bactericidal and fungicidal effects can be included in and on clothing, plaster, ink, wallboard, paper, adhesives, body care products (e.g., shampoos, toothpaste, and deodorants and antiperspirant products such as soaps, creams, sprays and the like), synthetic detergents, cutting oils, polymeric materials, embalming fluids, oil paints and latex paints, emulsion polishes for floor finishes, biocides for use in oil field, wood and lumber, etc., to prevent the attack of various bacterial, fungal and algal pests. Representative of the bacteria and fungi which the compositions inhibit are the following: *Staphylococcus aureus, Escherichia coli, Xanthomonas pruni, Penicillium digitatum, Aspergillus niger, Pullularia pullulans, Rhizopus stolonifer*, and the like.

In the following representative and clarifying examples, a convenient and meaningful method of measuring the effectiveness of antibacterial compositions known as the "Agar Dilution method" is employed, using various amounts and ratios of the individual antibacterial agents. Briefly stated, the test consists in dissolving the biostat or biostat mixture in an appropriate solvent (usually acetone) to obtain a stock solution ten times the highest concentration to be tested. This stock solution is then diluted by mixing 3 ml. of the stock solution with 27 ml. of sterile nutrient agar. From this test concentrate, the other test concentrations are made by direct dilution (or some of the subsequent lower concentrations) with the required amounts of untreated agar. The test mixtures are then poured into Petri dishes to fill one half of the area. The other half contains the untreated control agar. Both the treated and untreated agar are then seeded with appropriate representative test organisms by streaking across the plate. After an appropriate incubation time (one to several days), the plates are examined for inhibition properties of the biastat against the test organism.

In the following examples the resistant gram positive bacteria Staphylococcus aureus (ATCC-6538) was used as a representative test organism. The symbol "TBS" stands for 3,4'5-tribromosalicylanilide, "TCC" for 3,4,4'-trichlorocarbanilide, "HEX" for hexachlorophene, "THE" for 2,4,4'-trichloro-2'-hydroxydiphenyl ether, and "DSF" for N-(3,4-dichlorophenylcarbamyl)sulfanilyl fluoride, i.e., having the structure

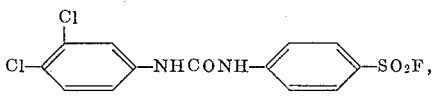

and representative of the N-(phenyl-carbamyl)amino-benzene sulfonyl fluoride agents described above and in the aforementioned application Ser. No. 270,348, now U.S. Pat. No. 3,743,675.

The following legend is used in the table summary of results set forth below.

Bacterial Growth

0 = No growth; ± = Trace growth; 1 = Partial growth; 2 = Intermediate growth; 3 = Moderate growth; 4 = Heavy growth.

mixtures is in all cases smaller than 1, in agreement with the observed synergism.

| Exp. No. | Compositions of Biocide, wt. % | $Q_a/Q_u + Q_B/Q_b$ |
|---|---|---|
| 2 | 85% DSF + 15% TBS | <0.67 |
| 3 | 75% DSF + 25% TBS | 0.82 |
| 4 | 50% DSF + 50% TBS | 0.64 |
| 5 | 25% DSF + 75% TBS | <0.70 |
| 6 | 15% DSF + 85% TBS | 0.68 |
| 9 | 85% DSF + 15% TCC | 0.79 |
| 10 | 75% DSF + 25% TCC | 0.80 |
| 11 | 15% DSF + 85% TCC | 0.86 |
| 14 | 75% DSF + 25% HEX | 0.62 |
| 15 | 50% DSF + 50% HEX | 0.63 |
| 16 | 25% DSF + 75% HEX | 0.65 |
| 19 | 75% DSF + 25% THE | 0.77 |
| 20 | 15% DSF + 85% THE | 0.86 |

First Series

| Exp. No. | Composition of Biocide wt. % | Concentration (total) of Biocide (p.p.m.) | | | | | | | | | | |
|---|---|---|---|---|---|---|---|---|---|---|---|---|
| | | 0.3 | 0.4 | 0.5 | 0.6 | 0.7 | 0.8 | 0.9 | 1.0 | 1.1 | 1.2 | 1.3 | 1.4 |
| 1 | 100% DSF | ± | 0 | 0 | | | | | | | | | |
| 2 | 85% DSF + 15% TBS | 0 | 0 | 0 | 0 | | | | | | | | |
| 3 | 75% DSF + 25% TBS | ± | 0 | 0 | 0 | | | | | | | | |
| 4 | 50% DSF + 50% TBS | ± | 0 | 0 | 0 | | | | | | | | |
| 5 | 25% DSF + 75% TBS | | | | 0 | 0 | 0 | | | | | | |
| 6 | 15% DSF + 85% TBS | | | | ± | 0 | 0 | 0 | 0 | 0 | 0 | | |
| 7 | 100% TBS | | | | | | | | | | | ± | 0 |

Second Series

| Exp. No. | composition of Biocide | Concentration (total) of Biocide (p.p.m.) | | | | | | |
|---|---|---|---|---|---|---|---|---|
| | | 0.25 | 0.3 | 0.35 | 0.4 | 0.45 | 0.5 | 0.55 |
| 8 | 100% DSF | 1 | 1 | ± | ± | 0 | 0 | 0 |
| 9 | 85% DSF + 15% TCC | ± | ± | 0 | 0 | 0 | 0 | |
| 10 | 75% DSF + 25% TCC | ± | ± | 0 | 0 | 0 | 0 | |
| 11 | 15% DSF + 85% TCC | ± | ± | 0 | 0 | 0 | 0 | |
| 12 | 100% TCC | 1 | ± | ± | 0 | 0 | 0 | 0 |

Third Series

| Exp. No. | Composition of Biocide | Concentration (total) of Biocide (p.p.m.) | | | | | | | |
|---|---|---|---|---|---|---|---|---|---|
| | | 0.2 | 0.25 | 0.3 | 0.35 | 0.4 | 0.45 | 0.5 | 0.55 |
| 13 | 100% DSF | | ± | ± | ± | ± | ± | 0 | 0 |
| 14 | 75% DSF + 25% HEX | ± | ± | 0 | 0 | 0 | 0 | | |
| 15 | 50% DSF + 50% HEX | ± | ± | 0 | 0 | 0 | 0 | | |
| 16 | 25% DSF + 75% HEX | | ± | 0 | 0 | 0 | 0 | | |
| 17 | 100% HEX | 2 | 1 | ± | ± | 0 | 0 | 0 | |

Fourth Series

| Exp. No. | Composition of Biocide | Concentration (total) of Biocide (p.p.m.) | | | | | | | | | |
|---|---|---|---|---|---|---|---|---|---|---|---|
| | | 0.01 | 0.02 | 0.03 | 0.04 | 0.06 | 0.08 | 0.10 | 0.15 | 0.20 | 0.25 | 0.30 |
| 18 | 100% DSF | | | | | | | | 2 | 1 | ± | 0 |
| 19 | 75% DSF + 25% THE | | 1 | ± | 0 | 0 | 0 | 0 | | | | |
| 20 | 15% DSF + 85% THE | ± | 0 | 0 | 0 | 0 | | | | | | |
| 21 | 100% THE | ± | 0 | 0 | 0 | 0 | | | | | | |

The foregoing results made demonstrably apparent to those skilled in the art the superior antimicrobial activities of the synergestic combinations of this invention. The synergism demonstrated by the compositions described above is shown further by calculating the sums of the ratios $Q_A \div Q_a$ and $Q_B \div Q_b$, in which $Q_A$ and $Q_B$ are the quantities of material A and material B used in the mixtures of minimum inhibitory concentrations, and $Q_a$ and $Q_b$ are the minimum inhibitory concentrations of the pure materials A and B, respectively, which will produce an end point. When the sum of this value is 1, the effect is the same as the toxic effect of each of the components of the mixture and there is no synergism; if, however, the sum of ratios is smaller than 1, synergism has occurred. This technique for determining synergism is discussed in more detail in the article by F. C. Kull et al., "Mixtures of Quaternary Ammonium Compounds and Long-chain Fatty Acids as Antifungal Agents," Applied Microbiology 9, pp. 538–541 (1961), and further by Shema et al., in U.S. Pat. No. 3,647,703, Mar. 7, 1972. As is evident, according thereto, from the data in the following table, the sum of ratios calculated for the various biocidal

I claim:

1. An antibacterial and antifungal composition consisting essentially of an effective amount of a mixture of (A) an N-(phenyl-carbamyl) amino-benzene sulfonyl fluoride of the formula

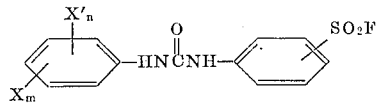

where X is chlorine, bromine, trifluoromethyl, methoxy or fluorosulfonyl; X' is hydrogen, chlorine, bromine, trifluoromethyl, methoxy or fluorosulfonyl; $m$ is a whole number from 1 to 3, and $n$ is a whole number from 1 to 3, with (B) a compound selected from the group consisting of 3,4', 5-tribromosalicylanilide, 3,4,4'-trichlorocarbanilide, hexachlorophene, and 2,4,-4'-trichloro-2'-hydroxydiphenyl ether, there being in the mixture 15 to 85% by weight of component (A) and, from 85 to 15% by weight of component (B).

2. The composition according to claim 1 wherein the N-(phenyl-carbamyl)aminobenzene sulfonyl fluoride is selected from the group consisting of N-(3,4-dichlorophenyl-carbamyl)-sulfanilyl fluoride,
N-(4-bromophenyl-carbamyl)-sulfanilyl fluoride,
N-(3-trifluoromethyl-4-chlorophenyl-carbamyl)-sulfanilyl fluoride,
N-(2,5-dichlorophenyl-carbamyl)-sulfanilyl fluoride,
N-(3-fluorosulfonylphenyl-carbamyl)-sulfanilyl fluoride,
N-(4-methoxyphenyl-carbamyl)-sulfanilyl fluoride, and
N-(3,4-dichlorophenyl-carbamyl)-metanilyl fluoride.

3. The composition according to claim 1 wherein the N-(phenylcarbamyl)aminobenzene sulfonyl fluoride is N-(3,4-dichlorophenylcarbamyl)-sulfanilyl fluoride.

4. The composition according to claim 1 wherein component (A) is N-(4-bromophenyl-carbamyl)-sulfanilyl fluoride.

5. The composition according to claim 1 wherein component (A) is N-(3-trifluoromethyl-4-chlorophenyl-carbamyl)-sulfanilyl fluoride.

6. The composition according to claim 4 wherein component (B) is 3,4′,5-tribromosalicylanilide.

7. The composition according to claim 5 wherein component (B) is 3,4′,5-tribromosalicylanilide.

* * * * *